United States Patent
Crews et al.

(10) Patent No.: US 6,347,011 B1
(45) Date of Patent: *Feb. 12, 2002

(54) PROJECTION SCREEN WITH MOVABLE SHUTTER

(75) Inventors: Doug A. Crews; Richard J. Richings, both of Seattle, WA (US)

(73) Assignee: Chin Music LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/602,605

(22) Filed: Jun. 21, 2000

Related U.S. Application Data

(63) Continuation of application No. 09/244,615, filed on Feb. 4, 1999, now Pat. No. 6,111,693.

(51) Int. Cl.[7] .............................................. G03B 21/56
(52) U.S. Cl. ........................ 359/446; 359/449; 359/461
(58) Field of Search ................................ 359/443, 446, 359/449, 450, 460, 461

(56) References Cited

U.S. PATENT DOCUMENTS

| | | | | |
|---|---|---|---|---|
| 570,255 A | * | 10/1896 | Kerner | 359/446 |
| 1,211,200 A | * | 1/1917 | McCormick | 359/449 |
| 1,954,656 A | * | 4/1934 | Vallen | 359/450 |
| 3,655,203 A | * | 4/1972 | Gretzky | 359/443 |
| 4,962,420 A | * | 10/1990 | Judenich | 358/60 |
| 5,080,481 A | * | 1/1992 | Martin et al. | 353/122 |
| 5,548,356 A | * | 8/1996 | Portman | 353/13 |
| 5,757,544 A | * | 5/1998 | Tabata et al. | 359/434 |
| 6,111,693 A | * | 8/2000 | Crews et al. | 359/446 |

* cited by examiner

Primary Examiner—Christopher E. Mahoney
(74) Attorney, Agent, or Firm—Summit Law Group

(57) ABSTRACT

A projection screen for displaying projected images with a movable shutter that can be positioned and opened at any location within a large rectangular area of the surface of the projection screen. Physical objects and light signals may pass through the open shutter. When the shutter is closed, the projection screen appears to a viewer as a continuous, unbroken, vertical reflective surface.

10 Claims, 9 Drawing Sheets

PROJECTION SCREEN WITH MOVABLE SHUTTER

CROSS-REFERENCE TO RELATED APPLICATION

This application is a continuation of U.S. patent application Ser. No. 09/244,615, filed Feb. 4, 1999, now U.S. Pat. No. 6,111,693.

TECHNICAL FIELD

The present invention relates to projection screens used to display moving and still images, and, in particular, to a screen with a movable shutter.

BACKGROUND OF THE INVENTION

Although projection screens have most commonly been used for movie theatres, educational and industrial image projection, and home entertainment systems, projection screens are finding many new applications related to computer-based simulators and games. These new applications include visual simulations of physical environments, such as race tracks, football fields, battlefields, and airports, in order to provide visual cues to a person interacting with various controls and instruments to control the movement and activities of one or more objects within the simulated environments, such as cars, football players, soldiers and armored equipment, and airplanes.

In certain of the above-mentioned applications, projection of a physical object through an enhanced projection screen towards a person interacting with the computer-based simulated environment can provide added realism and an essentially new dimension to the otherwise 2-dimentional nature of projected images. For example, in a simulation of a martial arts competition, an object thrown by a simulated opponent might be physically projected through the enhanced projection screen from a position on the surface of the enhanced projection screen that coincides with the projected image of the simulated opponent's throwing hand at the point in time that the simulated opponent releases the object. As another example, a simulator used by baseball players for batting practice may project a baseball through a projection screen displaying the image of a baseball pitcher pitching a baseball. Currently-available simulators that involve projection of physical objects from projection screens include one or several fixed locations, or ports, on the projection screen from which physical objects can be projected, greatly limiting the types of actions, such as throwing a martial arts weapon or a baseball, that can be simulated. In addition, the simulated images of the throwers must be unnaturally fitted and positioned so that the release point of a thrown object in the projected image physically coincides with a fixed port on the projection screen.

Alternatively, in certain applications, it may be desirable to use a projection screen that can accept objects. A projection screen may be used as a sorter, for example, behind which bins are placed for the collection of objects that are passed through the screen to fall into different bins. A projection screen that can accept objects is also desirable for entertainment applications. In a football system, for example, users may throw footballs at the projection screen. A passer throwing a football at a virtual receiver displayed on the projection screen can either throw an accurate pass that goes through an opening on the projection screen, or can throw an errant pass that hits the projection screen and bounces away from the projection screen. All such applications are constrained by the fixed position of the openings in currently-available projection screens.

Vendors of simulation and gaming systems have thus recognized a need for a projection screen through which physical objects may be passed at essentially any position on the screen via a movable port. Additionally, vendors of simulation and gaming systems have recognized a need for the ability to synchronize opening of the movable port in time and position with images displayed on the projection screen.

SUMMARY OF THE INVENTION

One embodiment of the present invention is a projection screen having a movable shutter that can be arbitrarily positioned within an inner rectangular region of the surface of the projection screen. When the movable shutter is closed, the projection screen appears, from a distance, to be a continuous, uniformly reflective, opaque surface. The movable shutter can be opened for predetermined lengths of time to allow objects, light signals, or other entities that cannot pass through a reflective screen to pass through the opened movable shutter.

The projection screen with movable shutter comprises a main frame having a front frame to which 5 separate reflective screens are mounted, a horizontally translatable frame mounted within the main frame, and a vertically translatable shutter assembly mounted within the horizontally translatable frame. The horizontally translatable frame can move across the interior-side of the front frame, under control of an electrical motor, to position the vertically translatable shutter assembly with respect to a horizontal axis defining locations on the projection screen. The vertically translatable shutter assembly moves up and down within the horizontally translatable frame, under control of an electrical motor, to position the vertically translatable shutter assembly with respect to a vertical axis defining locations on the projection screen. Thus, the vertical shutter assembly can be positioned at any location within a large rectangular area of the projection screen, defined by a pair of Cartesian coordinates x, z, by horizontal translation of the horizontally translatable frame to an x coordinate and vertical translation of the vertically translatable shutter assembly to a z coordinate.

The reflective surface of the projection screen comprises five flexible sheets. A first flexible sheet is attached to the left side of the horizontally translatable frame and is taken up and extended by a vertically-mounted, spring-loaded take-up/supply reel mounted on the left side of the front frame. Similarly, a second flexible reflective sheet is attached to the right side of the horizontally translatable frame and is taken up and extended by a vertically mounted, spring-loaded take-up/supply reel on the right side of the front frame. A third reflective, flexible sheet with a slot, or aperture, is held between lower and upper electrical-motor-operated take-up/supply reels that are horizontally-mounted to the bottom and top of the horizontally translatable frame. The vertically translatable shutter assembly has a front frame to which a face-plate with an aperture is mounted. The forward-facing surface of the face-plate has the same reflectivity and color as the five reflective, flexible sheets. Fourth and fifth reflective, flexible sheets are mounted vertically behind the third reflective, flexible sheet via spring-loaded, take-up/supply reels horizontally mounted to the top and bottom of the front frame of the vertically translatable shutter assembly so that the fourth and fifth reflective, flexible sheets extend vertically above the vertically translatable shutter assembly to the top of the main frame and below the vertically translatable shutter assembly to the bottom of the main frame. The five reflective, flexible sheets present to a viewer of the projection screen the appearance of a continuous, flat, unbroken reflective display surface except when the aperture in the third, reflective, flexible sheet is moved past the aperture in the face plate mounted to the vertically translatable shutter assembly. While the two apertures overlap, an opening appears in the surface of the projection screen directly in front of the vertically translatable shutter assembly. The speed of movement of the third, reflective, flexible sheet determines the period of time during which the movable shutter is open. Movement of the horizontally translatable frame, the vertically translatable shutter assembly, and the third reflective, flexible screen is controlled by electrical servo motors that are, in turn, controlled by signals generated by a software program running on a computer.

DETAILED DESCRIPTION OF THE INVENTION

One embodiment of the present invention is a projection screen with a movable shutter ("PSMS") that can be positioned and opened anywhere within a large, rectangular area on the surface of the projection screen. The shutter is opened when an aperture within a vertically-movable flexible sheet overlaps an aperture in a horizontally and vertically translatable Z-axis carriage face plate. Otherwise, the surface of the projection screen appears to a remote viewer as a continuous, reflective, vertical plane. Physical objects or light signals for reverse projection can be passed through the opened shutter.

Figure 1:
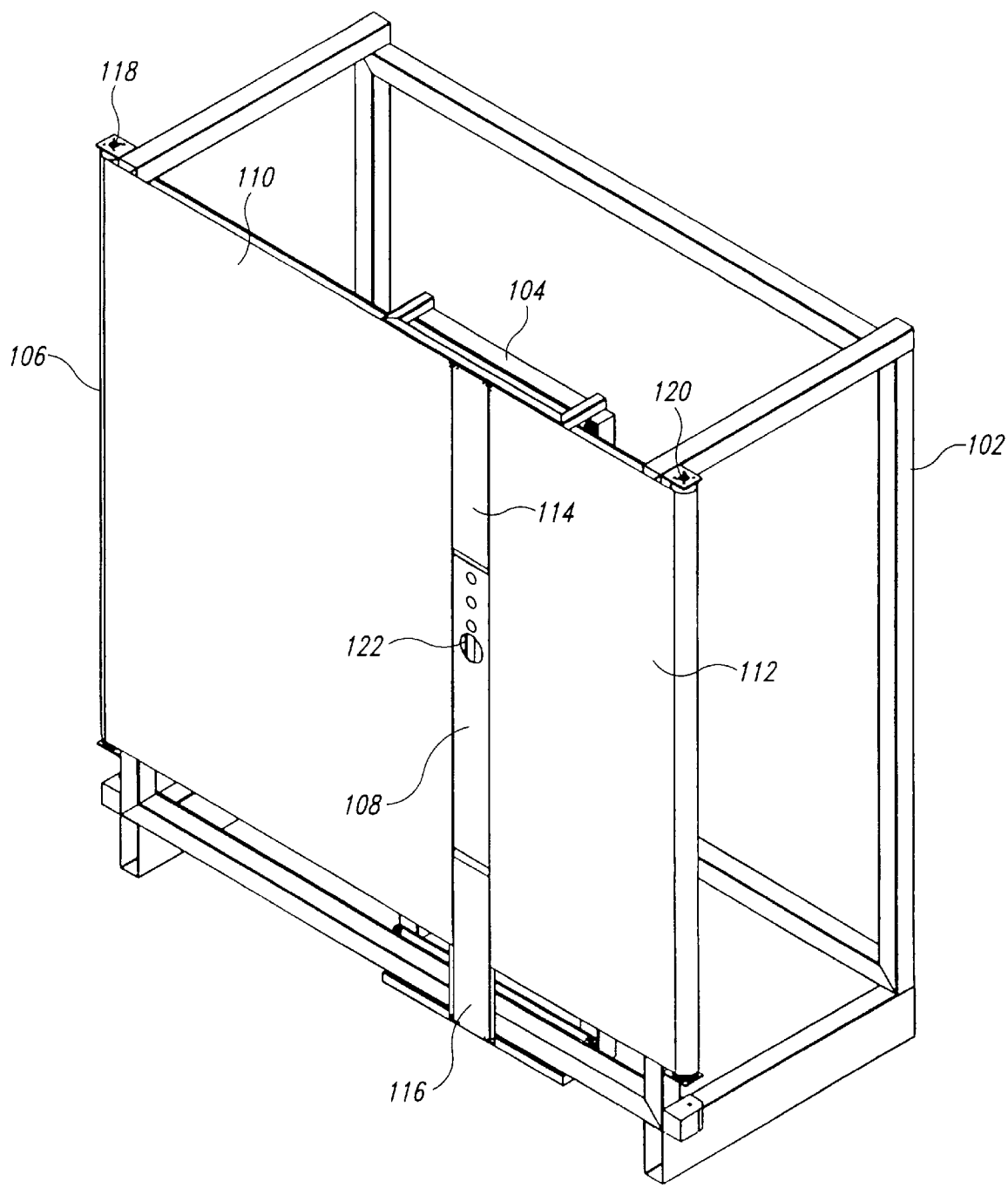
FIG. 1 illustrates a number of components of the projection screen with a movable shutter.

FIG. 1 illustrates a number of components of the PSMS as seen from a viewer's perspective. The illustrated PSMS components include a main frame 102, an X-axis frame 104 that translates horizontally across the interior side of the front frame 106 of the main frame, a front face plate 108 of a Z-axis carriage that translates vertically within the X-axis frame, and four reflective, flexible sheets 110, 112, 114, and 116 that are extended and retracted from four take-up/supply reels 118 and 120 (two horizontally mounted take-up/supply reels not shown in FIG. 1). When an aperture 122 in the front face plate 108 of the Z-axis carriage is aligned with an aperture in a fifth reflective, flexible sheet mounted vertically in front of reflective, flexible sheets 114 and 116, and the front face plate 108 of the Z-axis carriage (fifth reflective, flexible sheet not shown in FIG. 1), the two aligned apertures together form an opening in the projection screen through which objects or light signals may pass.

Figure 2:
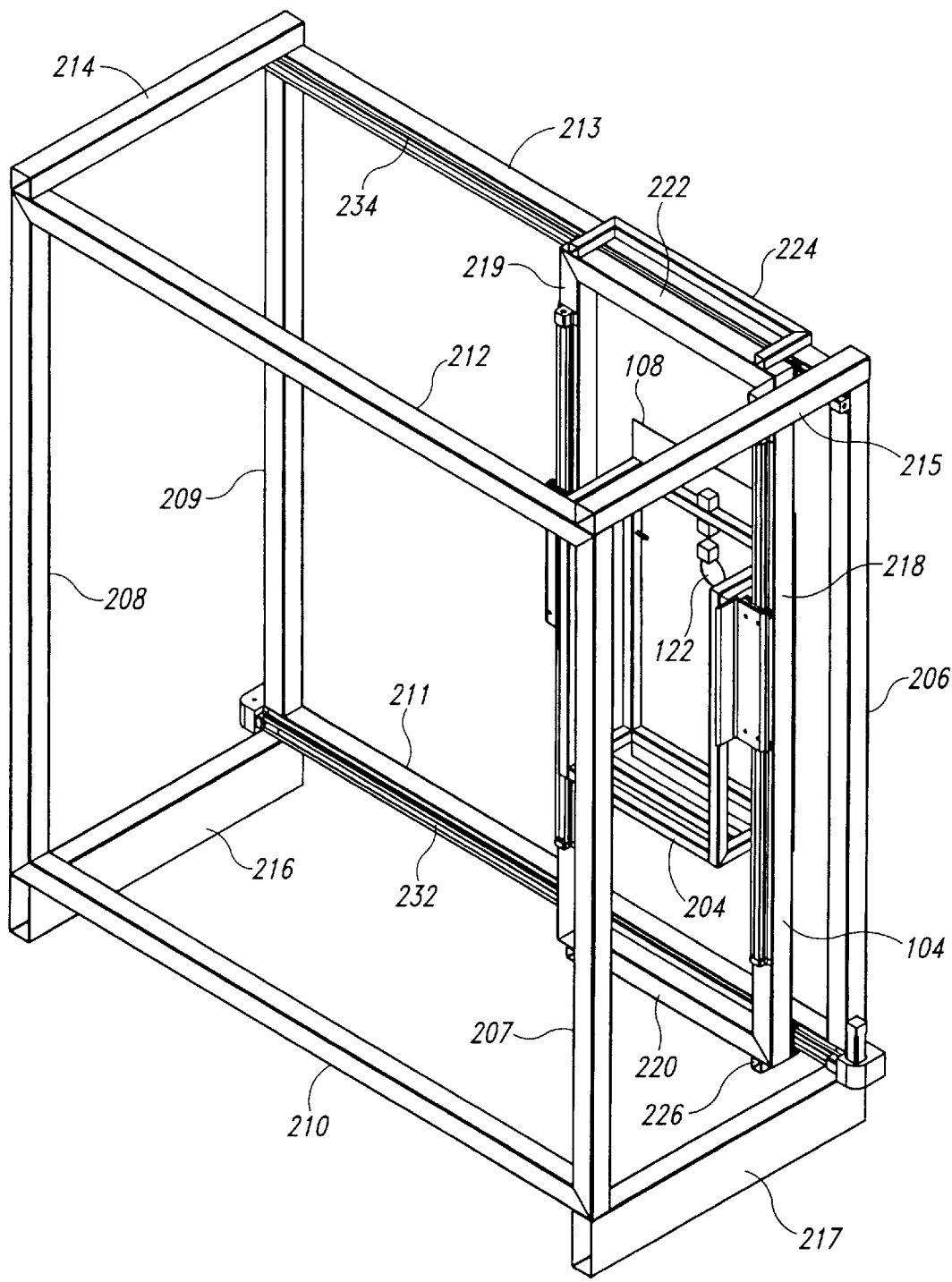
FIGS. 2 and 3 illustrate the main frame, X-axis frame, and Z-axis carriage of the projection screen with a movable shutter.
Figure 3:
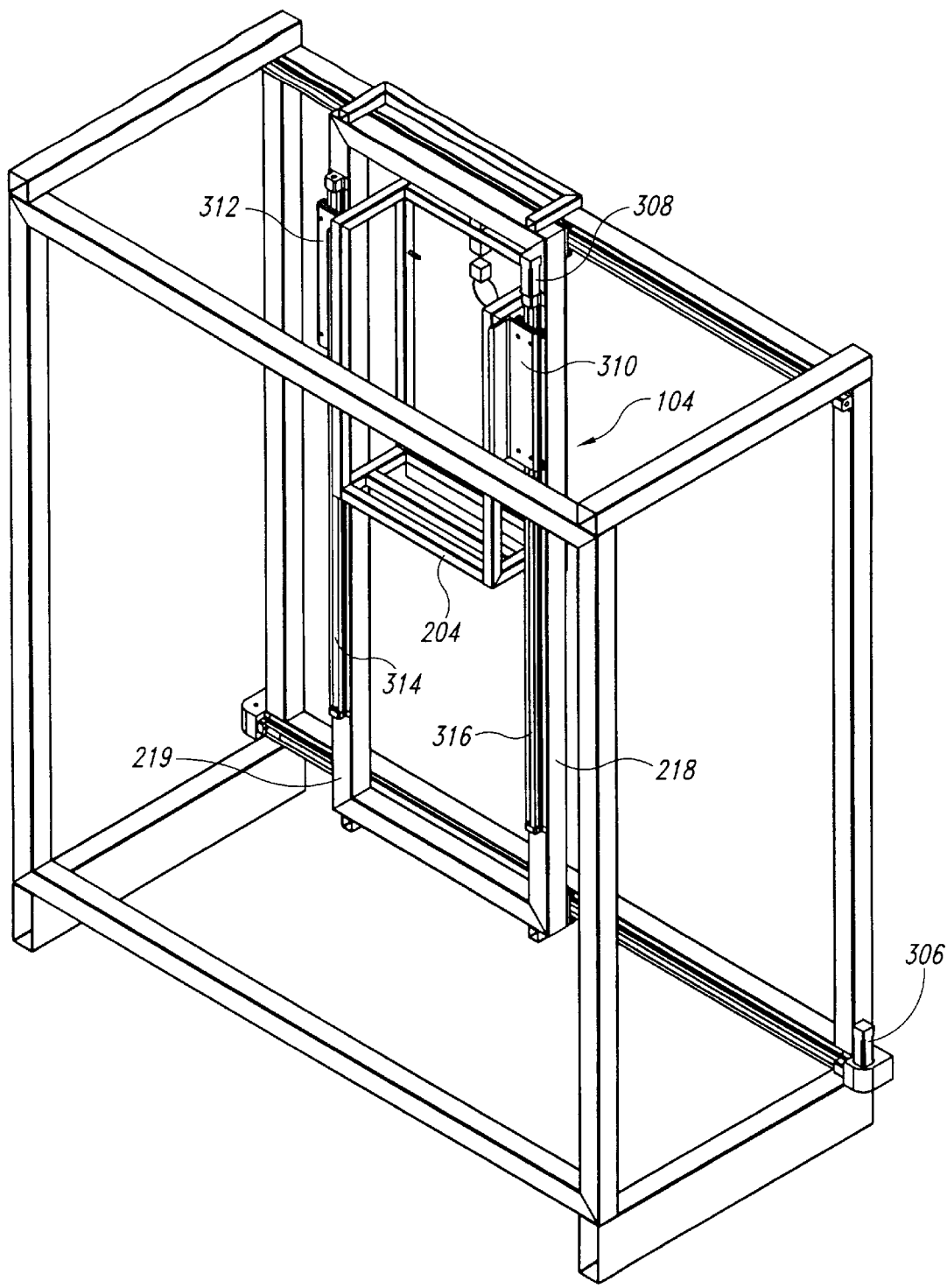

FIGS. 2 and 3 illustrate the main frame, X-axis frame, and Z-axis carriage of the PSMS. In FIG. 2, the X-axis frame 202 is positioned towards the left-hand side of the plane of the projection screen (left and right-handedness is with respect to a vantage point in front of the PSMS, as illustrated in FIG. 1), and, in FIG. 3, the X-axis frame 302 is positioned at the right-hand side of the projection screen. Similarly, in FIG. 1, the Z-axis carriage 204 is positioned towards the center of the X-axis frame 202, while in FIG. 3, the Z-axis carriage 304 is positioned towards the top of the X-axis frame 302. Thus, FIGS. 2 and 3 show horizontal movement of the X-axis frame across the plane of the projection screen, and also show vertical movement of the Z-axis carriage along the X-axis frame. The main frame comprises four vertical members 206–209, four long horizontal members 210–213, two short upper horizontal members 214–215, and two short base members 216 and 217. The vertical, long horizontal, and upper short horizontal members 206–215 are machined lengths of four-inch square tubular steel welded together as indicated in FIGS. 2 and 3. In a preferred embodiment, X-axis motion and Z-axis motion are controlled by belt-driven and lead screw-driven linear motion systems mounted to the inner sides of the horizontal member 211 and vertical member 218 of the main frame and X-axis frame, respectively. Dual Vee Lo Pro Linear Motion Systems from Bishop-Wisecarver Corp. of Pittsburg, Calif. are employed in both cases. The X-axis belt driven linear motion system, Lo Pro part number 3 SCSBG3 DH100 S, is powered by a vertically mounted electrical servomotor 306 and the Z-axis lead-screw-driven linear motion system, Lo Pro part number #SCSLSD, is also powered by a vertically mounted electrical servomotor 308. Linear motion systems from Thomson Saginaw Corp. of Port Washington, N.Y. can also be used to drive the X and Z axes. The X-axis frame 202 comprises two vertical members 218–219 and two horizontal members 220 and 222 welded together as indicated in FIG. 1 to form a rectangular frame. The vertical and horizontal members 218–222 are machined lengths of four inch square steel tubing. The X-axis frame also includes an upper semi-rectangular support 224 and a lower semi-rectangular support 226. Both semi-rectangular supports comprise three machined sections of two inch square steel tubing welded together as indicated in FIG. 1. The upper semi-rectangular support 224 is welded to the top surface of the X-axis horizontal member 222, and the lower semi-rectangular support 226 is welded to the bottom surface of the lower X-axis horizontal member 220. A faceplate 228 is attached to the projection screen side of the Z-axis carriage 204. The faceplate contains an aperture 230 through which a physical object may be projected. The X-axis frame is mounted to the main frame horizontal members 211 and 213 by pairs of rollers (not shown) fixed to the projection screen side of the horizontal members of the X-axis frame 220 and 222 that grip and roll along linear roller tracks 232 and 234 affixed to the inner surfaces of the main-frame horizontal members 211 and 213. Similarly, the Z-axis carriage 204 is mounted to the X-axis frame by pairs of rollers attached to the projection screen side of two angle bracket members 310 and 312 affixed to vertical members on either side of the Z-axis carriage 304 which grip and roll along vertically-mounted roller tracks 314 and 316 affixed to the inner surface of X-axis frame vertical members 318 and 320, respectively. A more detailed description of the roller and roller tracks follows.

Figure 4A:
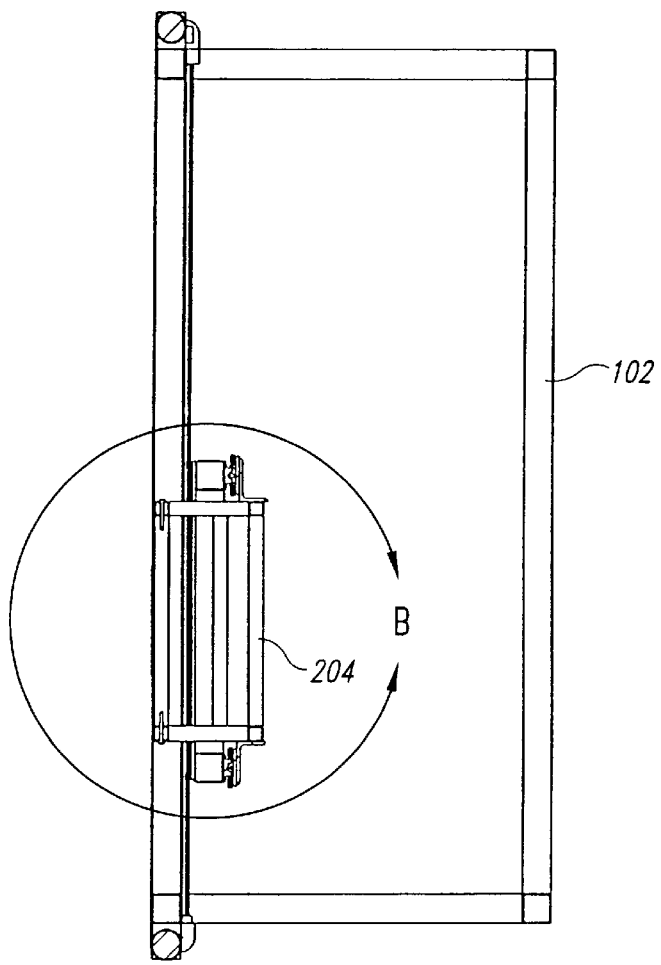
FIGS. 4A–C illustrate the roller and roller track mechanism of the Z-axis carriage.
Figure 4B:
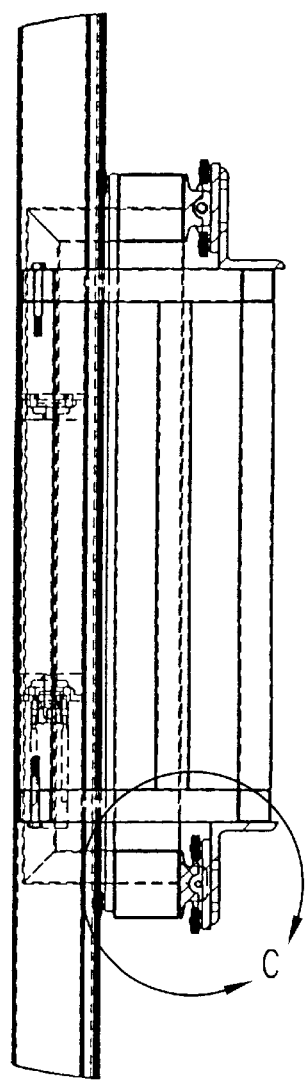
Figure 4C:
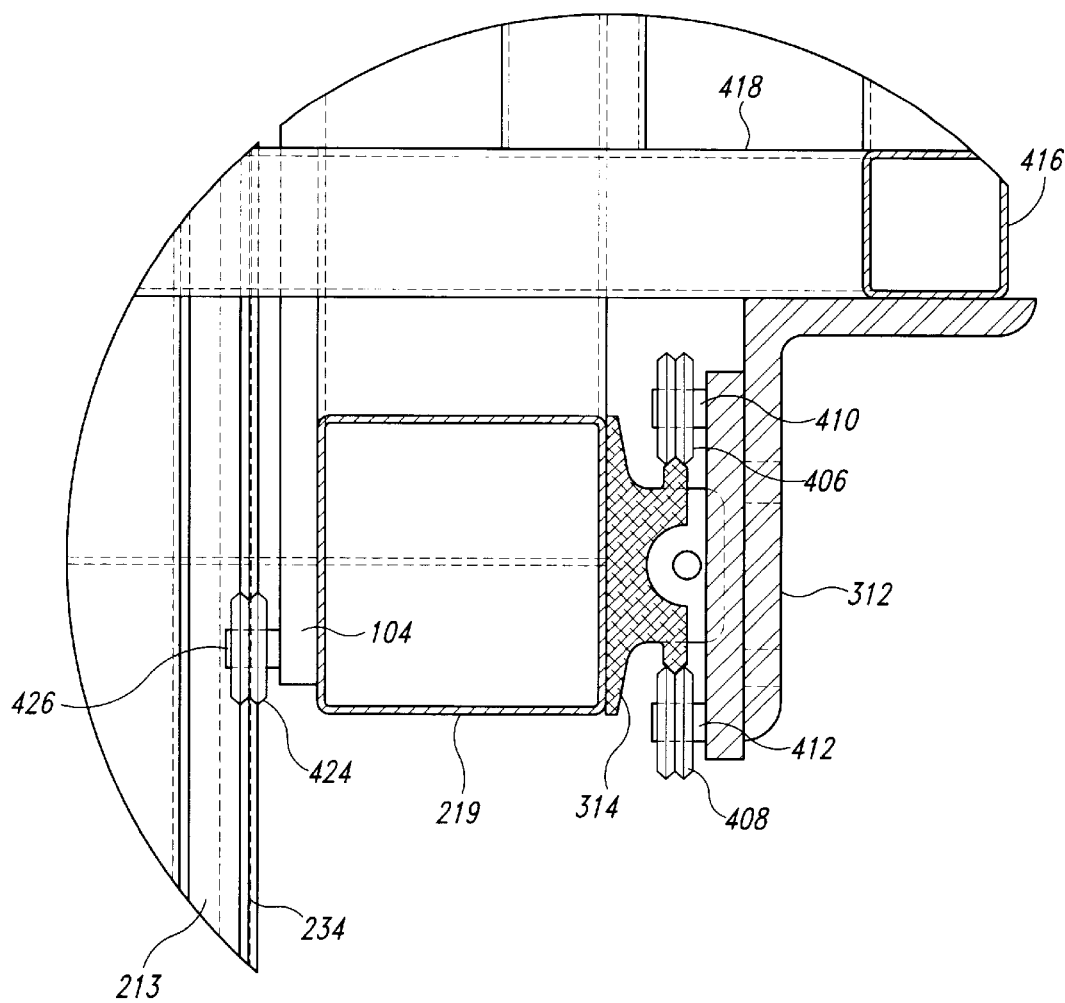

FIGS. 4A–C illustrate the roller and roller track mechanism of the Z-axis carriage. FIG. 4A shows a section view of the main frame 402 and Z-axis carriage 404 looking down, in a vertical direction, from the top of the PSMS. FIG. 4B shows, in more detail, the circled portion of FIG. 4A, and FIG. 4C shows, in greater detail, the circled portion of FIG. 4B. In FIG. 4C, two Z-axis rollers 406 and 408, are mounted on shafts 410 and 412, respectively, that are affixed to an angle member 414 of the Z-axis carriage. The angle member 414 is affixed to vertical member 416 and horizontal member 418 of the Z-axis carriage. The rollers ride along a linear track 420 affixed to a vertical member 422 of the X-axis frame. An X-axis frame roller 424 is attached via a shaft 426 to the X-axis frame 428 and tracks along the upper edge of a roller track 430 affixed to the inside edge of an upper mainframe horizontal member 432.

Figure 5:
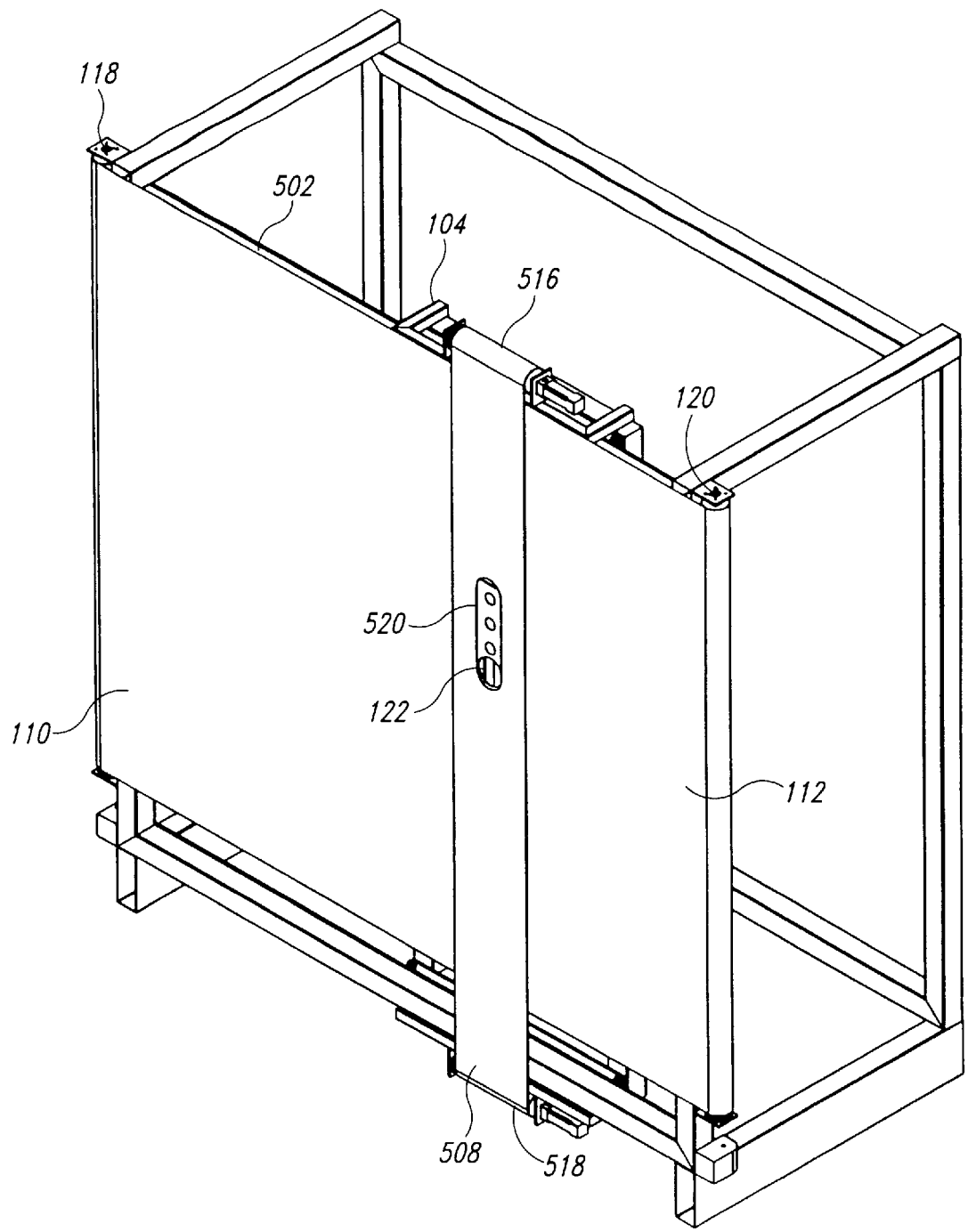
FIG. 5 illustrates the projection screen with a movable shutter.

FIG. 5 illustrates the projection screen with a movable shutter as seen from a viewer's perspective. The vertical projection screen 502 comprises five separate flexible reflective sheets, including flexible reflective sheets 504, 506, and 508 (two of the five flexible, reflective sheets are not shown in FIG. 5, but are shown above, in FIG. 1, 114 and 116, and below, in FIG. 6, 607 and 608). The left-hand flexible reflective sheet 504 is vertically attached to the X-axis frame 505 (vertical attachment not shown) and extends across the face of the PSMS to a vertically mounted, spring-loaded take-up/supply reel 510. The right-hand sheet 506 is vertically attached to the X-axis frame 505 (vertical attachment not shown) and extends across the face of the PSMS to a vertically mounted, spring-loaded take-up/supply reel 512. A top sheet (not shown) is horizontally attached to the X-axis frame and extends vertically between the top of the face of the PSMS to a spring-loaded take-up/supply reel horizontally mounted to the top of the Z-axis carriage. A bottom sheet (not shown) is horizontally attached to the X-axis frame and extends vertically between the bottom of the face of the PSMS to a spring-loaded take-up/supply reel horizontally mounted to the bottom of the Z-axis carriage. All four of the above-mentioned spring-loaded, take-up/supple reels are supplied by Milwaukee Protective Covers, Inc., of Milwaukee, Wis., the vertical spring-loaded take-up/supply reels supplied as part number 70-3-PN-11. The same type of reels are available from other manufacturers of roll-up covers. The multiple internal springs in the reels generate a band tension of 38.4 pounds-force on the sheet to maintain a smooth and flat appearance to the user.

As the X-axis frame 505 moves horizontally across the face of the PSMS in a leftward direction, the left-hand take-up/supply reel 510 reels in the left-hand flexible sheet 504 while, at the same time, the right-hand take-up/supply reel 512 feeds out the right-hand flexible sheet 506. Conversely, when X-axis frame 505 moves across the face of the PSMS in a rightward direction, the left-hand take up/supply reel 510 feeds out flexible sheet 504 while the right-hand take-up/supply reel 512 reels in flexible sheet 506. As the Z-axis carriage moves vertically upward along the X-axis frame, the top take-up/supply reel reels in the top flexible sheet while, at the same time, the bottom take-up/supply reel feeds out the bottom flexible sheet. Conversely, when Z-axis carriage moves vertically downward along the X-axis frame, the top take-up/supply reel feeds out flexible sheet while the bottom take-up/supply reel reels in flexible sheet. The third flexible reflective sheet 508 is mounted between two horizontally-mounted, servo-motor-controlled take-up/supply reels 516 and 518 that provide for vertical motion of the third flexible sheet 508. In one embodiment of the PSMS, Parker-Hannifin Corp. SM-NO923KR-NMSB electrical servomotors are employed. Alternate sources for the electrical servomotors are: Ormec Systems Corp. of Rochester, N.Y.; Hitachi America, Ltd. of Tarrytown, N.Y.; and Baldor Electric Corp. of Fort Smith, Ark. The third flexible reflective sheet lies above the top and bottom flexible sheets and obscures the top and bottom flexible sheets in FIG. 5. All five reflective, flexible sheets are constructed of one or more of the following materials, available from manufacturers of elastomers and textiles worldwide, in a thickness of 16 thousandths of an inch up to 32 thousandths of an inch:

Neoprene®, cloth-inserted

EPDM (ethylene propylene diene monomer)

Hypalon®

SBR (styrene butadiene rubber)

White Nitrile® FDA sheet (food grade Neoprene® plus Nitrile® rubber coated polyamid)

Viton® (fluoro elastomer)

Fluorosilicone

Cloth, coated or impregnated with rubber or Teflon®.

The two horizontally-mounted servo-motor-controlled take-up/supply reels 516 and 518 and the third flexible sheet 508 together compose the I-axis. The third flexible sheet 508 includes a rounded slot-like aperture 520 that can be quickly passed over the release point 522 through which an object or light signal may pass. Thus, motion of the aperture 520 across the aperture 522 in the Z-axis carriage face plate, controlled by the servo-motor-controlled take-up/supple reels 516, 518, provides a shutter, open for the time interval during which the two apertures overlap, through which an object or light signal may pass. Otherwise, the aperture 520 is positioned either above or below the aperture 522 in the Z-axis carriage face plate, over the Z-axis carriage face plate or over one of the top and bottom flexible sheets, so that, from a distance, the entire vertical projection screen 502 appears to be uniformly colored and uniformly reflective. In a preferred embodiment, the two I-axis electrical servo motors are electronically coupled in a master/slave relationship.

Figure 6:
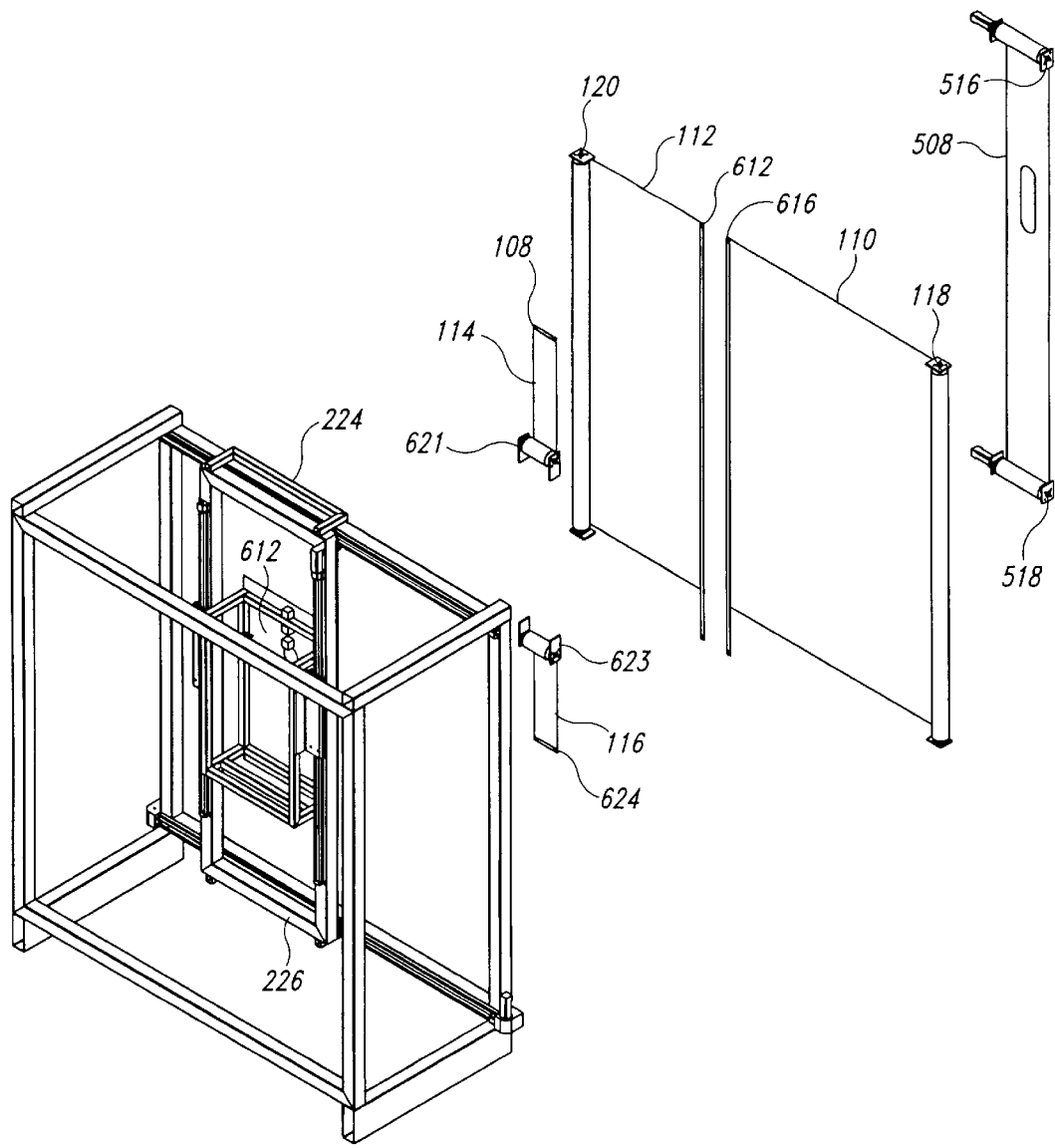
FIG. 6 is an exploded view of the projection screen with a movable shutter.

FIG. 6 is an exploded view of the vertical projection screen of the PSMS. The vertical projection screen comprises the Z-axis carriage faceplate 602, the right-hand flexible reflective screen 604, the left-hand flexible reflective screen 605, the I-axis vertical flexible screen 606, the top flexible reflective sheet 607, and the bottom flexible reflective sheet 608. The faceplate 602 is mounted directly to the front face of the Z-axis carriage. The right-hand flexible reflective screen 604 extends and retracts from a vertical take-up/supply reel 610 and is affixed to a vertical steel rod 612. Similarly, the left-hand flexible reflective screen 605 is extended from a vertical take-up/supply reel 614 and is attached to a vertical steel rod 616. The top end of the right-hand vertical steel rod 612 is welded to the projection screen side of the upper semi-rectangular support member 618 of the X-axis frame and the lower end of the vertical steel rod 612 is welded to the projection screen side of the lower semi-rectangular support member 620 of the X-axis frame. Similarly, the top and bottom ends of the left-hand vertical steel rod 616 are welded to the projection screen sides of the upper semi-rectangular support member 618 and the lower semi-rectangular support member 620, respectively. The top flexible reflective screen 607 extends and retracts from a horizontal take-up/supply reel 621 and is affixed to a horizontal steel rod 622. Similarly, the bottom flexible reflective screen 608 is extended from a horizontal take-up/supply reel 623 and is attached to a horizontal steel rod 624. The horizontal steel rod 622 is welded to the projection screen side of the upper semi-rectangular support member 618 of the X-axis frame and the horizontal steel rod 624 is welded to the projection screen side of the lower semi-rectangular support member 620 of the X-axis frame. The horizontal take-up/supply reels 621 and 623 are mounted to the top and bottom of the Z-axis carriage, respectively. The I-axis flexible screen extends between two servo-motor-driven take-up/supply reels 626 and 628. The upper servo-motor-driven take-up/supply reel 626 is mounted on the upper X-axis frame semi-rectangular support member 618 and the lower servomotor driven take-up/supply reel 628 is mounted to the lower X-axis semi-rectangular support member 620.

Figure 7:
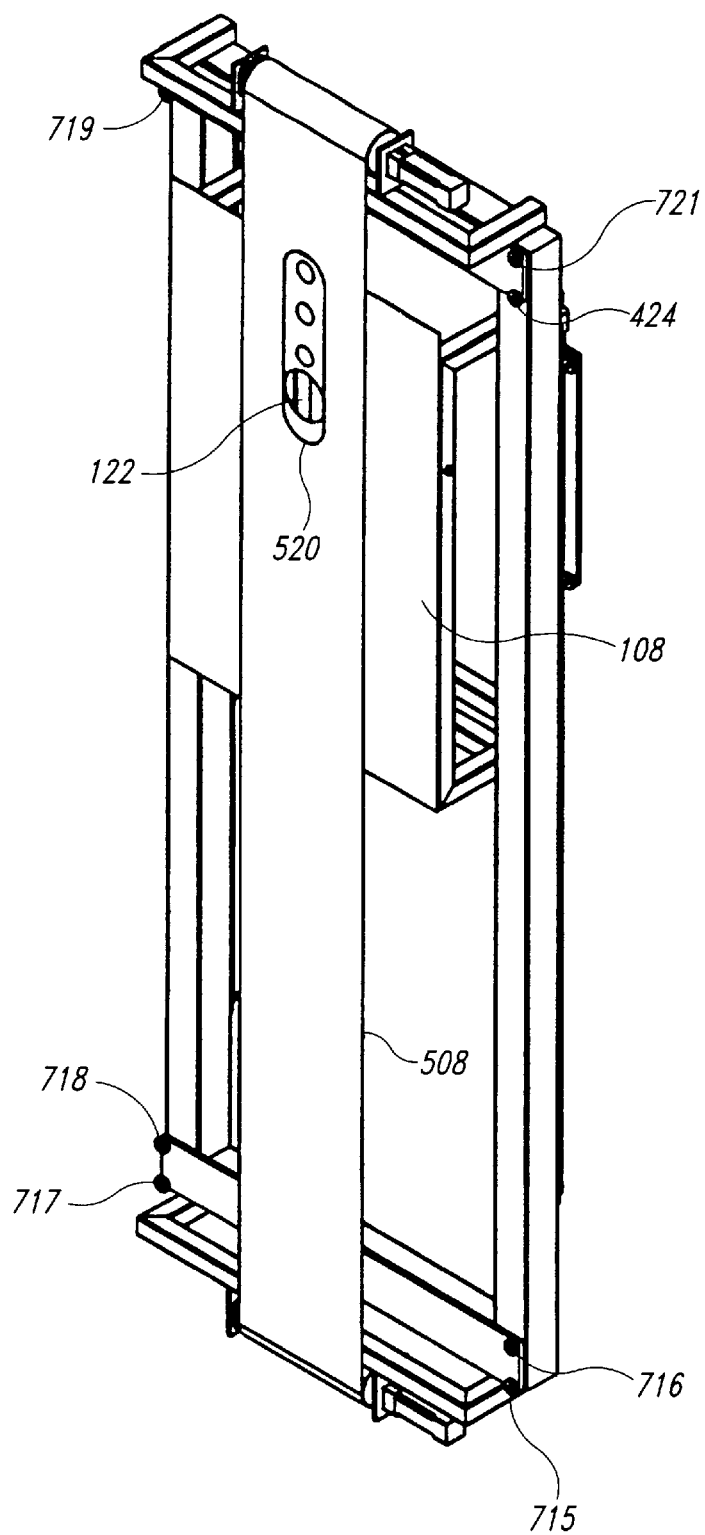
FIG. 7 is a front view of the I-axis projection screen mounted to the X-axis frame.

FIG. 7 is a front view of the I-axis projection screen mounted to the X-axis frame. The rounded slot 702 of the I-axis projection screen 704 is moved over the aperture 706 in the Z-axis carriage faceplate 708 in order to provide an opening in the projection screen. Seven of the eight rollers 715–721 by which the X-axis frame is mounted to the horizontal roller tracks of the main frame are shown in FIG. 7.

Figure 8:
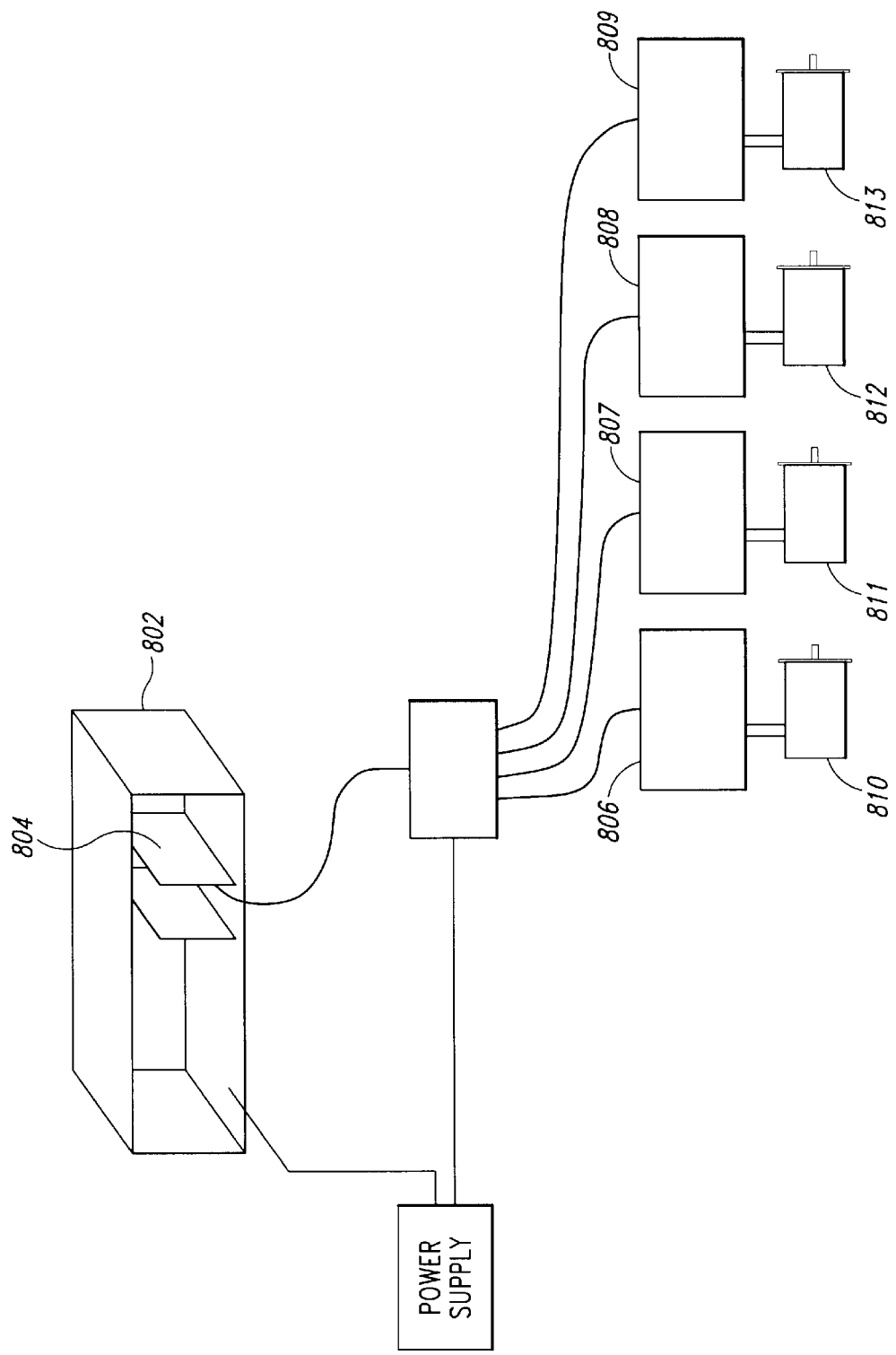
FIG. 8 illustrates electrical and computer control of the projection screen with a movable shutter.

FIG. 8 illustrates the electrical and computer control of the PSMS. In a preferred embodiment, the PSMS is controlled by software programs running on a personal computer ("PC") 802. The PC 802 includes a motion control card 804 that includes logic for translating software-specified parameters into electrical servo motor rotation. The motion control cards produce control signals that are amplified by servo amplifiers 806–809 in order to control the various electrical servomotors 810–813, including the electrical servo motors that control motion of the X-axis frame across the projection axis, motion of the Z-axis carriage within the X-axis frame, and motion of the I-axis reflective, flexible sheet. Voltage signals sent from the servo amplifiers 806–809 direct the electrical servomotors 810–813 to accelerate and rotate at particular rotational speeds for particular lengths of time. Software routines running on the PC 802 translate high-level specifications, such as the positions on the projection screen at which the movable shutter needs to be opened and the lengths of times that the movable shutter needs to be opened.

Although the present invention has been described in terms of a particular embodiment, it is not intended that the invention be limited to this embodiment. Modifications within the spirit of the invention will be apparent to those skilled in the art. For example, many types of component configurations and methods of attaching and mounting components to various assemblies different from those shown in the figures and described in the above text may be employed, like, for example, bolting rather than welding. An almost limitless number of different software implementations can be employed to control the electrical servomotors of the PSMS. PSMSs of different sizes and aspect ratios can be built for different purposes, and additional components can be added to the Z-axis carriage for projecting and receiving physical objects and light signals through the opened shutter. Curved and other non-planar PSMSs can be built following the same principles as those outlined above for the described preferred embodiment. Different types of motion control components can be used to drive the X-axis and Z-axis translations, and to drive the I-axis reflective, flexible screen.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. A projection screen with a movable shutter, the projection screen comprising;
   a flat reflective screen;
   a translatable shutter; and
   a shutter translating and opening component that moves a center of the translatable shutter to a specified position on the surface of the flat reflective screen and opens the translatable shutter for a specified time interval.

2. A projection screen that reflects images and provides for a movable shutter opening comprising:
   a main frame;
   a first internal frame slidably mounted within the main frame that moves horizontally within the main frame under control of an electrical servomotor;
   a second internal frame slidably mounted within the first internal frame that moves vertically within the first internal frame under control of an electrical servomotor;
   a left-hand flexible reflective screen dynamically mounted between the left-hand side of the main frame and the left-hand side of the first internal frame and a right-hand flexible reflective screen dynamically mounted between the right-hand side of the main frame and the right-hand side of the first internal frame; and
   an upper flexible reflective screen dynamically mounted between the top of the first internal frame and the top of the second internal frame and a lower flexible reflective screen dynamically mounted between the bottom of the first internal frame and the bottom of the second internal frame;
   a face plate mounted to the second internal frame, the face plate having a first aperture; and
   a vertical flexible reflective screen with a second aperture dynamically mounted between the top and bottom of the first internal frame, so that, when the second aperture is moved along with the vertical flexible reflective screen past the first aperture, a shutter comprising the first and second apertures opens for the period of time during which the second aperture overlies the first aperture.

3. The projection screen of claim 2 wherein the left-hand flexible reflective screen, right-hand flexible reflective screen, upper flexible reflective, lower flexible reflective screen, and vertical flexible screens together compose the projection screen.

4. The projection screen of claim 2 wherein the left-hand flexible reflective screen, right-hand flexible reflective screen, upper flexible reflective, and lower flexible reflective screen are each dynamically mounted between a spring-loaded takeup/supply reel and a rod, so that each flexible reflective screen is played out from, and retracted into, the takeup/supply reel as the distance between the rod and the takeup/supply reel varies due to movement of frames relative to one another.

5. The projection screen of claim 2 wherein the vertical flexible reflective screen is each dynamically mounted between a first electrical-servomotor-controlled takeup/supply reel affixed to the top of the first internal frame and a second electrical-servomotor-controlled takeup/supply reel affixed to the bottom of the first internal frame, the electrical-servomotor-controlled takeup/supply reels operating together to move the vertical flexible reflective screen in upward and downward vertical directions.

6. The projection screen of claim 2 wherein the main frame, first internal frame, and second internal frames each comprises an upper horizontal, a lower horizontal, and a pair of vertical members.

7. The projection screen of claim 2 wherein the first internal frame is moved horizontally within the main frame by a first-frame electrical servomotor and the second internal frame is moved vertically within the first internal frame by a second-frame electrical servomotor.

8. The projection screen of claim 7 wherein a computer controls input signals to the first-frame electrical servomor and the second-frame electrical servomotor to position the first aperture at a specified position on reflective screen formed by the the main frame and the computer controls input signals to the first electrical-servomotor-controlled takeup/supply reel and the second electrical-servomotor-controlled takeup/supply reel to the first actuator motor, setting up the first movable carriage, provides control to drive the second aperture past the first aperture to open the shutter.

9. The projection screen of claim 2 wherein the main frame, first internal frame, and second internal frame are planar, so that the projection screen is planar.

10. THe projection screen of claim 2 wherein the shutter comprising the first and second apertures is normally closed, so that the projection screen is continuously reflective across its entire surface, and wherein the shutter is opened for a short time in order to allow an object or signal to pass from one side of the projection screen to the other side of the projection screen.

* * * * *